United States Patent [19]
Modell

[11] 4,147,624
[45] Apr. 3, 1979

[54] WASTEWATER TREATMENT WITH DESORBING OF AN ADSORBATE FROM AN ADSORBENT WITH A SOLVENT IN THE NEAR CRITICAL STATE

[75] Inventor: Michael Modell, Cambridge, Mass.

[73] Assignee: Arthur D. Little, Inc., Cambridge, Mass.

[21] Appl. No.: 677,390

[22] Filed: Apr. 15, 1976

[51] Int. Cl.$^2$ .............. B01D 15/06; B01D 15/00; B01J 21/20; B01J 29/38
[52] U.S. Cl. .................. 210/32; 210/34; 210/40; 252/412; 252/414; 260/674 SA; 568/758
[58] Field of Search ............ 252/412, 414; 210/24, 210/40, 32, 39, 30, 34; 260/627, 674 SA; 568/758

[56] References Cited
U.S. PATENT DOCUMENTS

| | | | |
|---|---|---|---|
| 1,724,531 | 8/1929 | Stratford | 252/414 |
| 2,098,779 | 11/1937 | Gericke et al. | 260/627 R |
| 2,343,165 | 2/1944 | Adler | 260/627R |
| 3,123,553 | 3/1964 | Abrams | 210/24 R |
| 3,477,856 | 11/1969 | Schultz | 426/424 |
| 3,939,281 | 2/1976 | Schwengers | 426/430 |
| 3,966,981 | 6/1976 | Schultz | 426/425 |
| 3,979,287 | 9/1976 | Vulliez-Serment et al. | 210/40 |

FOREIGN PATENT DOCUMENTS 51-31679  3/1976  Japan .................. 252/415

Primary Examiner—Winston A. Douglas
Assistant Examiner—P. E. Konopka
Attorney, Agent, or Firm—Bessie A. Lepper

[57] ABSTRACT

An adsorbate is removed from an adsorbent by contacting the adsorbent with a near critical liquid which is a solvent for the adsorbate. The near critical liquid containing the dissolved adsorbate is then subjected to at least partial vaporization to form a vapor in which the adsorbate is substantially less soluble thereby making it possible to remove the adsorbate from the near critical liquid. The vapor is then condensed to restore it to the near critical liquid state wherein it is a solvent for the adsorbate so that it may be reused. The process is particularly suitable for adsorbent regeneration in the treating of waste-waters.

11 Claims, 6 Drawing Figures

WASTEWATER TREATMENT WITH DESORBING OF AN ADSORBATE FROM AN ADSORBENT WITH A SOLVENT IN THE NEAR CRITICAL STATE

This invention relates to the regeneration of adsorbents and more particularly to a process for desorbing adsorbates from adsorbents by dissolving the adsorbate in an inert solvent maintained in what is hereinafter termed the "near critical liquid" state.

In the purification and removal of impurities from fluid streams in many industrial processes an adsorbent is used to adsorb the impurities from the fluid stream. Adsorbents may also be used to separate components in a process and to isolate trace impurities for quantitative analysis. In other processes, unwanted adsorption of poisons on catalytic surfaces may occur and require removal.

Thus, for example, small amounts of organics, both aliphatic and aromatic, have been removed by being adsorbed on activated carbon or polymeric adsorbents in the treatment of wastewaters from industrial processes. Color bodies are adsorbed in the process of sugar refining and impurities are removed from vinyl chloride streams through adsorption. In petroleum cracking processes the high surface area catalytic materials such as alumina, silica or like materials, with or without such metals as nickel, cobalt, molybdenum or tungsten deposited thereon, become contaminated by impurities which are adsorbed on them and, in some cases, chemically reacted. In all such cases, the adsorbates must be periodically removed from the adsorbents.

A number of inorganic adsorbents have been known and used for some time and they may generally be defined as solid phase materials having very high surface area-to-weight ratios and exhibiting the ability to concentrate adsorbates on their surfaces. Among the more commonly used inorganic adsorbents are activated carbon, alumina, silica, and silicates. (See for example Table 16-2 of "Chemical Engineers' Handbook" Robert H. Perry and Cecil H. Chilton, McGraw-Hill, New York, Fifth Edition, 1973, pp 16-5 through 16-9.)

The use of such inorganic adsorbents normally includes one or more steps to effect their regeneration, i.e., the removal of all or a part of the adsorbate which adheres to the surface of the adsorbent. If the adsorbate is a volatile material, such regeneration may be accomplished by heating the adsorbent to volatilize off the adsorbate or by creating a vacuum around the adsorbent. Volatilization with heating may be accompanied by rection with some added reactant, e.g., oxygen to oxidize adsorbed organic materials. It is, of course, apparent that the less volatile adsorbates require higher temperatures to remove them in this manner and such tempertures may contribute to the gradual thermal degradation of the adsorbent and/or adsorbate. Moreover, any reactant added, such as oxygen, may chemically degrade such adsorbents as activated carbon, causing loss of usable capacity. Such losses require that the adsorbent be periodically replaced. Finally, the use of high temperatures for adsorbent regeneration requires a relatively high expenditure of energy.

Activated carbon used in removing organic impurities from wastewaters may be taken as exemplary of the type of performance now being attained in the use and regeneration of inorganic adsorbents. High surface area (1000-1300 m$^2$/g) activated carbon has a high capacity (0.1 to 50g/g) for most organic materials. When used as a adsorbent for treating aqueous solutions, activated carbon is usually regenerated by oxidizing the adsorbed organics with air and/or steam at high temperature, e.g., 500°-700° C. Under such conditions, there is a loss of 3 to 10% of the activated carbon adsorbent for each regeneration resulting from partial oxidation of the activated carbon. Thus, the average lifetime of activated carbon is 10 to 30 regenerations. The adsorbent loss therefore becomes a significant fraction of the total operating cost.

The use of a vacuum to remove adsorbates from an adsorbent requires the equipment necessary to generate the required degree of evacuation and it is a technique which is limited to only certain classes of adsorbates, namely those which exhibit appreciable vapor pressure at temperatures below their decomposition point. That is, many low volatility solids and liquids will decompose before their vapor pressure becomes appreciable. Finally, the use of high temperature for adsorbent regeneration requires a relatively high expenditure of energy.

Although activated carbon, as well as various other inorganic adsorbents is still widely used for many purposes, the development of synthetic polymeric adsorbents in recent years has extended the use of adsorbents in industrial processes to a much wider range of applications than heretofore associated with activated carbon. In some instances, polymeric adsorbents have replaced activated carbon, silica, alumina and the like. One of the primary reasons for the rapidly expanding use of polymeric adsorbents lies in the fact that liquids may be used to remove the adsorbate from the polymeric adsorbent through the mechanism of solvation or reaction. Since this liquid removal is normally carried out under ambient conditions, many of the disadvantages inherent in the regeneration of activated carbon, for example, can be eliminated.

In regenerating the polymeric adsorbents, an organic solvent such as methanol or isopropanol may be used. If the adsorbate is a weak acid, a base may be used to react with it to remove it; and, if the adsorbate is a weak base, an acid may be used as a reactant. Finally, where adsorption is from an ionic solution water may be used; and, where the adsorbate is a volatile material, hot water or steam may be used.

By far, the most widely used technique for polymeric adsorbent regeneration is solvent extraction. After loading the adsorbate to the breakthrough point with the adsorbed species, an appropriate organic solvent is passed through the polymeric adsorbent bed to dissolve and extract the adsorbate. The cost of using solvents for the regeneration of the polymeric adsorbents requires that a high percentage of the solvent be recovered. Moreover, many such solvents, whether in bulk or in small quantities, cannot be disposed of without raising serious pollution problems. In recovering and purifying such solvents for reuse, operational factors are encountered which add considerably to the cost of such recovery.

In solvent regeneration the solvent is used to displace water (or other liquid from which the impurity is removed) from the adsorbate bed. This means that a solvent-water mixture is obtained which must be separated in the solvent recovery process. Since some of the more common and inexpensive solvents which are most effective for the regeneration of the polymeric adsorbents from azeotropes with water, such azeotropes must be dealt with in solvent recovery. In the distillation of a mixture which forms an azeotrope one column is used to recover one component and the azeotrope. The azeotrope must then be sent to a second column operating at either higher or lower pressures in order to recover the other component in a purified form. Each of such columns may require a large number of theoretical plates. It is therefore apparent that although the use of a solvent for the adsorbed species in the regeneration of a polymeric adsorbent involves no new art, it presents a serious economic problem. Indeed, the severity of the solvent recovery problem often rules out the use of synthetic polymeric resin adsorption unless the unpurified regenerating-solvent stream can be recycled or otherwise used economically in a contiguous process.

In copending patent applications Ser. No. 512,124 filed Oct. 4, 1974, and in Ser. No. 677,387 filed concurrently herewith I have described the use of supercritical fluids as adsorbate solvents to regenerate both inorganic and organic polymeric adsorbents. In using these supercritical fluids for adsorbent regeneration it is necessary during the desorbing process to maintain them in their supercritical state, i.e., at a pressure and temperature above the critical pressure and critical temperature of the solvent fluid. In the case of some adsorbents, e.g., those having extremely small pore sizes and in those adsorbate-adsorbent systems where the desorption process is highly mass-transfer limited, the supercritical fluids have distinct advantages in adsorbent regeneration. However, where the solubility characteristics of the solvent and the pore structure of the adsorbent are favorable to the use of temperatures and pressures lower than those required to maintain the solvent in the supercritical state, the use of solvents in the so-called near critical liquid state has distinct advantages. For example, the use of lower pressure materially reduces the cost of the pressure vessel in which desorption is accomplished. Moreover, in some cases it may be easier to separate the solute from a near critical liquid than from a supercritical fluid. Although it is necessary to supply the latent heat of vaporization of the solvent liquid using a near critical liquid, it is possible to operate within a near critical temperature region to keep this heat requirement to a minimum.

When compared to the use of liquid solvents such as those now presently used in regenerating the polymeric adsorbents, the use of a near critical liquid has several marked advantages, among which are the possession of superior mass transfer characteristics, of higher volatilities and of lower heats of vaporization of the solvent. These advantages, in turn, give rise to the need for less energy and the possiblility of improved solute (adsorbate) recovery.

It would therefore be desirable to have a process by which adsorbates could effectively be removed or extracted from adsorbents which was efficient and economical and intermediate in operational conditions between the use of liquid solvents and supercritical fluids.

It is therefore a primary object of this invention to provide an improved process for regenerating adsorbents. It is another object to provide a process of the character described based on the dissolution of adsorbates which makes possible the efficient and economical recovery of the solvent used and, if desired, of the adsorbate. Still another object is to provide such a process which is applicable to a wide range of adsorbent-adsorbate combinations and which employs operating conditions less severe than those required in the use of supercritical fluids.

Another principal object of this invention is to provide an improved process for wastewater purification using in particular polymeric adsorbents to remove organic impurities and an inert solvent in the form of a near critical liquid to extract absorbates from the adsorbent to regenerate it. A still further objet is to provide a process of the character described in which inevitable solvent losses do not contribute additional pollution problems.

Another principal object of this invention is to provide improved apparatus for the regeneration by desorption of adsorbents. A further object is to provide new and improved apparatus for the treatment of waters.

Other objects of the invention will in part be obvious and will in part be apparent hereinafter.

In the process of this invention adsorbents are regenerated by desorbing adsorbates from them by dissolving the adsorbates in a chemically inert solvent in the form of a near critical liquid.

The process comprises the steps of contacting an adsorbent with adsorbate adhered thereto with the near critical liquid thereby to dissolve the adsorbate in the near critical liquid; separating the near critical liquid with the adsorbate dissolved therein from the adsorbent; vaporizing at least a portion of the near critical liquid containing the adsorbate dissolved therein to form a multi-phase system comprising solvent rich vapor and an adsorbate-rich phase; condensing the solvent-rich vapor to form a liquid; and adjusting the temperature and pressure of the condensed liquid thereby to convert it to the near critical liquid for recycling in the process. The process is particularly well suited to the removal of organic materials such as color bodies, surfactants and biological materials from wastewaters.

The apparatus of this invention comprises pressure vessel means for effecting contact between an adsorbent with an adsorbate adhered thereto and a near critical liquid solvent for the adsorbate under conditions of temperature and pressure which maintain the solvent in its near critical liquid state, whereby the adsorbate is desorbed from the adsorbent and taken up in the near critical liquid solvent; vaporizer/separator means to vaporize at least a portion of the near critical liquid as a solvent-rich vapor and to separate and collect the absorbate as an adsorbate-rich phase separate from the vapor; fluid conduit means connecting the pressure vessel means and the vaporizer/separator means arranged to conduct the near critical liquid solvent containing the adsorbate into the separator means; condenser means to condense the solvent-rich vapor, received from the vaporizer/separator means, to a liquid; and means to adjust the temperature and pressure of the liquid from the condenser means to the near critical state for recycling. The apparatus may also include vessel means for effecting contact between a fluid stream containing the material to be removed and the adsorbent contained within the vessel means; and means to circulate the fluid containing the material through the vessel means wherein the material is adsorbed as an adsorbate on the adsorbent. The pressure vessel means may, if desired, be also employed as the vessel means in which contact is effected by the fluid containing the material to be removed and the adsorbent.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a plot of the solubility of naphthalene in carbon dioxide as a function of specific volume, illustrative of one adsorbate/solvent system applicable to this invention;

Figure 1:
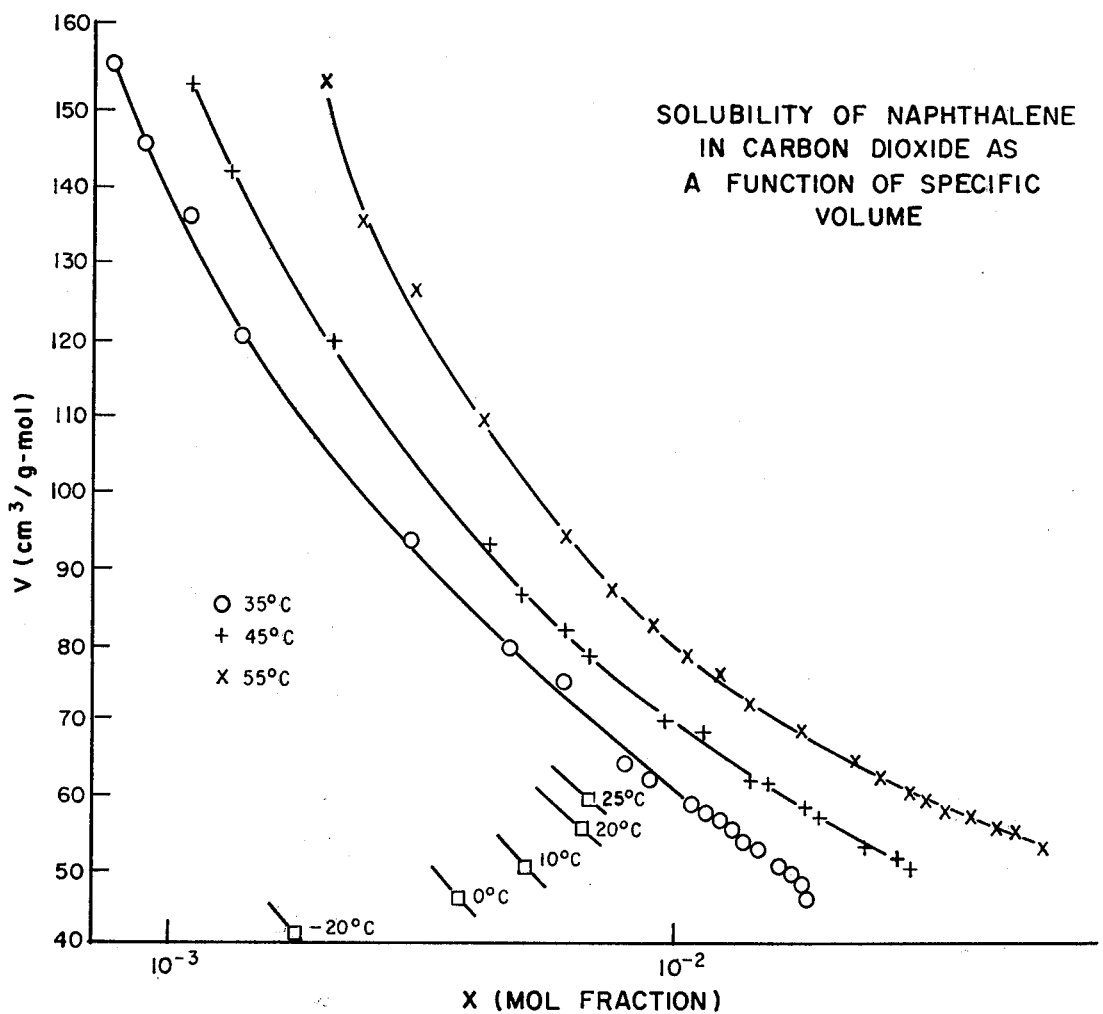

As noted above, the inorganic adsorbents, e.g., activated carbon, alumina, silica and the like have been used for a number of years and recently polymeric adsorbents have been widely used, particularly in wastewater treatments. The commercially available polymeric adsorbents may be described as hard, insoluble, high surface area, porous polymers. Typically, they are provided in spherical form with a nominal mesh size of about 16 to 50. They are available in a variety of polarities and surface characteristics thus making it possible to use them as adsorbents in a wide range of applications. For example, the polymeric adsorbents may be polymers of styrene, copolymers of styrene and divinylbezene, or a polymer containing an acrylic ester, trimethylolpropane trimethacrylate, or trimethylolpropane dimethacrylate. See for example Richard M. Simpson "The Separation of Organic Chemicals from Water" presented at the Third Symposium of the Institute of Advanced Sanitation Research, International on Apr. 13, 1972, wherein exemplary chemical structures for polymeric adsorbents are given. See also German Offenlegungsschrift No. 1,943,807.

The polymeric adsorbents have found many varied applications in wastewater treatments. For example, they have been used to decolorize kraft pulp mill bleaching effluent and dye wastes and to remove pesticides from waste streams, alkylbenzene sulfonate or linear alkyl sulfonate type surfactants from wastewaters and explosives such as TNT and DNT from effluent streams. These polymeric adsorbents have also been used in analysis procedures for determining trace amounts (as little as parts per billion) of organic contaminants in water, in chemical processing and in isolating enzymes and proteins as well as other biological materials such as Vitamin B-12, tetracycline, oxytetracycline and oleandomycin.

Exemplary of the pesticides which can be removed by adsorption on a polymeric adsorbent from a waste stream are Lindane, DDT and Malathion and pesticide ingredients such as endrin, heptachlor and other chlorinated hydrocarbon intermediates.

Exemplary of the organics which may be removed from a water stream using polymeric adsorbents are those listed in Table 1 as reported by Junk et al., *Journal of Chromatography* 99 745–762 (1974). The resins used were two different polystyrenes characterized as having 42% and 51% helium porosity, surface areas of 330 and 750 m$^2$/gram, average pore diameters of 90 and 50 Å, skeletal densities of 1.08 and 1.09 grams/cc respectively, and a nominal mesh sizes of 20 to 50. (Sold as XAD-2 and XAD-4 by Rohm and Haas Company)

Table 1

Organics Removable From a Water Stream
By Adsorption on Polymeric Adsorbents

Alcohols
  Hexyl
  2-Ethylhexanol
  2-Octanol
  Decyl
  Dodecyl
  Benzyl
  Cinnamyl
  2-Phenoxyethanol
Aldehydes and Ketones
  2,6-Dimethyl-4-heptanone
  2-Undecanone
  Acetophenone
  Benzophenone
  Benzil
  Benzaldehyde
  Salicylaldehyde
Esters
  Benzyl acetate
  Dimethoxyethyl phthalate
  Dimethyl phthalate
  Diethyl phthalate
  Dibutyl phthalate
  Di-2-ethylhexyl phthalate
  Diethyl fumarate
  Dibutyl fumarate
  Di-2-ethylhexyl fumarate
  Diethyl malonate
  Methyl benzoate
  Methyl decanoate
  Methyl octanoate
  Methyl palmitate
  Methyl salicylate
  Methyl methacrylate
Polynuclear aromatics
  Naphthalene
  2-Methylnaphthalene
  1-Methylnaphthalene
  Biphenyl
  Fluorene
  Anthracene
  Acenaphthene
  Tetrahydronaphthalene
Alkyl benzenes
  Ethylbenzene
  Cumene
  p-Cymene
Acids (acidified)
  Octanoic
  Decanoic
  Palmitic
  Oleic
  Benzoic
Phenols
  Phenol
  o-Cresol
  3,5-Xylenol
  o-Chlorophenol
  p-Chlorophenol
  2,4,6-Trichlorophenol
  1-Naphthol
Ethers
  Hexyl
  Benzyl
  Anisole

Table 1-continued
Organics Removable From a Water Stream By Adsorption on Polymeric Adsorbents 2-Methoxynaphthalene
Phenyl
Halogen compounds
  Benzyl chloride
  Chlorobenzene
  Iodobenzene
  o-Dichlorobenzene
  m-Dichlorobenzene
  1,2,4,5-Tetrachlorobenzene
  α-o-Dichlorotoluene
  m-Chlorotoluene
  2,4-Dichlorotoluene
  1,2,4-Trichlorobenzene
Nitrogene compounds
  Hexadecylamine
  Nitrobenzene
  Indole
  o-Nitrotoluene
  N-Methylaniline
  Benzothiazole
  Quinoline
  Isoquinoline
  Benzonitrile
  Benzoxazole As noted above, the polymeric adsorbents are regenerated by dissolving off the adsorbate when the adsorbent bed has reached a predetermined point of saturation, normally referred to as the breakthrough point and defined as that point when the stream discharged from the bed contains a preset level of the adsorbate. As also previously noted, this removal of the adsorbate has previously been accomplished in the prior art by using an organic liquid solvent, such as methanol or isopropanol, under ambient temperature and pressure, and has included a costly solvent recovery procedure.

According to the process of this invention, a near critical liquid is used for adsorbent regeneration, whether the adsorbent is an inorganic such as activated carbon or a polymeric resin.

A near critical liquid as the term implies is a liquid, the temperature and pressure of which are near the critical temperature and pressure. It is intermediate in solvation properties between a normal liquid under essentially atmospheric conditions and a supercritical fluid. As used hereinafter and for purposes of this invention, the term "near critical liquid" defines a liquid the temperature of which lies between 0.95 and 0.955 times its critical temperature in °K. and the pressure of which is at least equivalent to the vapor pressure of the liquid at the temperature used. Although pressures considerably in excess of the corresponding vapor pressure may be used, it will be preferable, from the standpoint of equipment design and energy required, to use pressures as close as possible to the corresponding vapor pressure of the liquid. Thus for example in the case of carbon dioxide, the critical temperature of which is 304.2° K. (31.0° C.), the near critical carbon dioxide liquid temperature should range between about 289° K. and about 303° K. (between about 16° C. and 30° C.). At 25° C., which is within the near critical range specified, the vapor pressure of liquid carbon dioxide is 65 atmospheres. Therefore the preferable pressure range for 25° C. carbon dioxide liquid lies between about 65 and 75 atmospheres.

Liquid carbon dioxide has been extensively investigated as a solvent for a large number of organic compounds of widely varying composition and structure and for several inorganic compounds (see for example A. W. Francis, *J. Phys. Chem.*, 58, 1099 (1954) and A. W. Francis, *Ind. Eng. Chem.*, 47, No. 2, 232 (1955).

The solubility properties in the near critical liquid and supercritical fluid ranges can be illustrated using the naphthalene/carbon dioxide system as examplary. The solubility of naphthalene in carbon dioxide above and below critical temperature is reported in the literature (Yu. V. Tsekhanskaya, M. B. Iomtev, and E. V. Mushkina, *Zh. Fiz. Khim.*, 36, 2187 (1962); *Zh. Fiz. Khim.*, 38, 2166 (1964); Yu V. Tsekhanskaya, N. G. Roginskaya and E. V. Mushkina, *Zh. Fiz. Khim.*, 40, 2137 (1966); and E. L. Quinn, *J. Amer. Chem. Soc.*, 50, 672 (1928)).

The solubility data from these references are plotted as a function of specific volume in FIG. 1 for supercritical conditions (35° C., 45° C. and 55° C.); and points for the near critical range (20° C. and 25° C.) as well as for temperatures below the near critical range (10° C., 0° C. and −20° C.) are located on the plot of FIG. 1. From the data available for the supercritical range it is apparent that there is a trend of increasing solubility with decreasing specific volume. At constant volume, increasing the temperature brings about an increase in solubility whether in the supercritical or subcritical range.

In order to correlate these data for variable temperature, a new parameter, represented as $X_N'$, was defined as follows:

$$X_N' = X_N \frac{P_{vpN}^L}{P_{vpN}^S}$$

where $P_{vpN}^L$ and $P_{vpN}^S$ are the vapor pressures of liquid and solid naphthalene at the temperature for which the naphthalene solubility, $X_N$, was determined.

Figure 2:
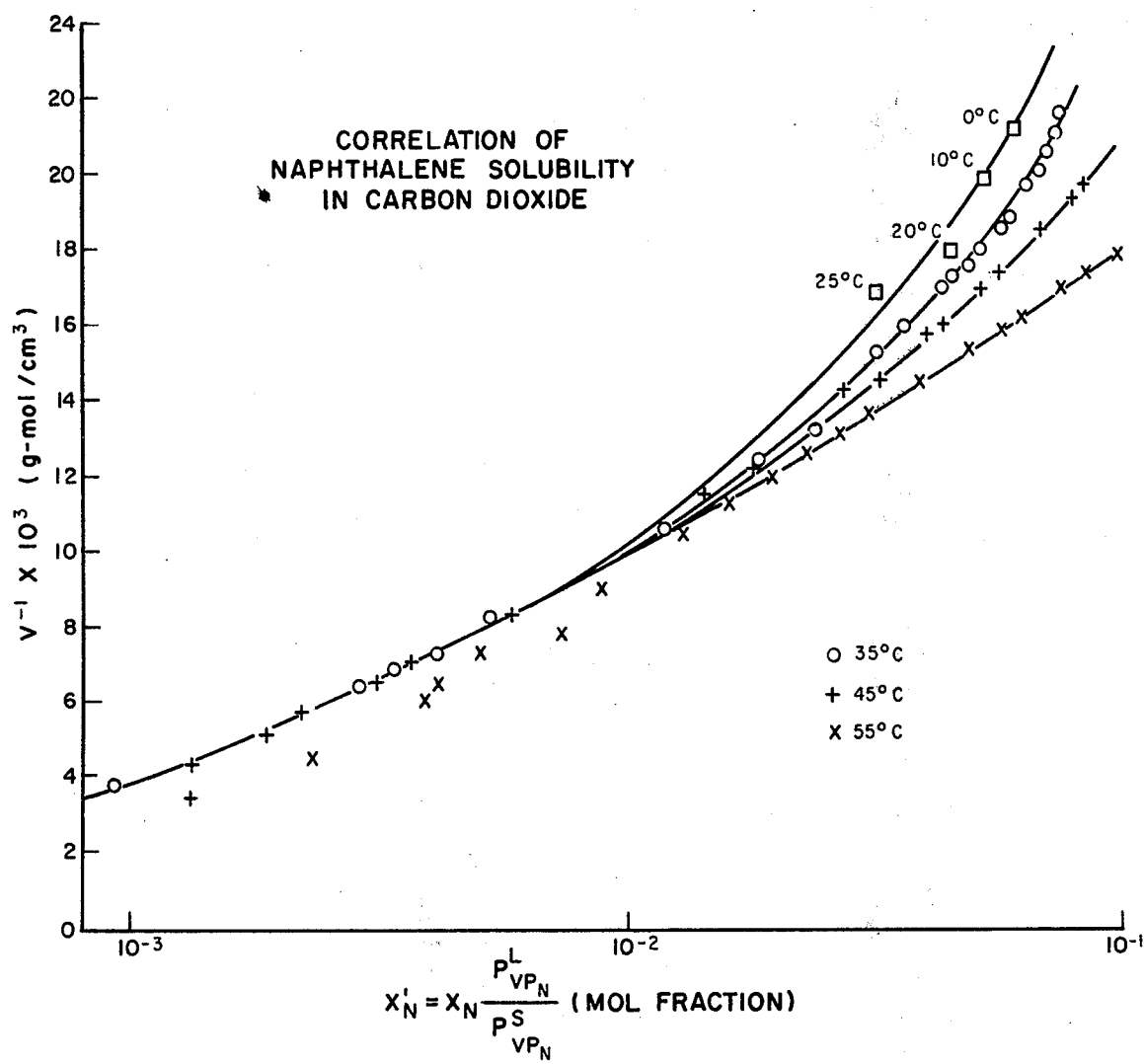
FIG. 2 is plot of the correlation of naphthalene solubility in carbon dioxide for supercritical and near critical conditions.

A plot of $X_N'$ versus specific volume is shown in FIG. 2, from which it can be seen that the factor $X_N'$ materially reduces the temperature variation. In fact, all of the subcritical data fall on a smooth curve only slightly displaced from the 35° C. curve.

The correlation of FIG. 2 was then used to develop a plot of naphthalene solubility in carbon dioxide ranging from subcritical to supercritical conditions. At any given temperature and pressure, the specific volume was determined from naphthalene/carbon dioxide mixture data, when available, or from pure carbon dioxide properties. (See for example, M. P. Vukalovich and V. V. Altunin, "Thermophysical Properties of Carbon Dioxide." Collet's Ltd., London, 1968). The value of $X_N'$ was then determined from FIG. 2, and $X_N$ was back calculated by multiplying $X_N'$ by $P_{vpN}^S/P_{vpN}^L$. The results of these calculations are plotted in FIG. 3. The solid lines are isobaric data; and the dashed line represents data for saturated liquid and saturated vapor below and up to the critical point.

Figure 3:
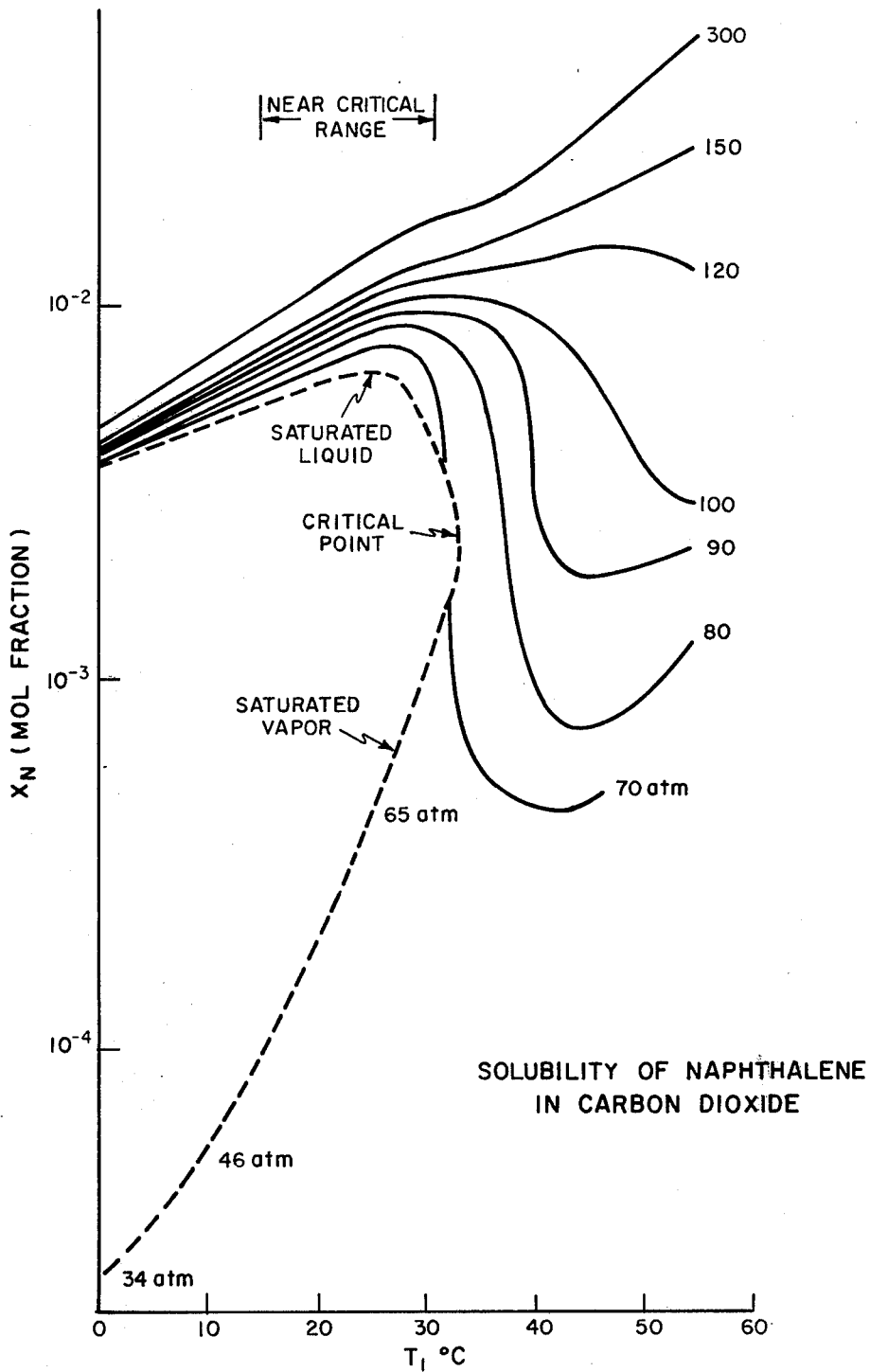
FIG. 3 is a plot of the solubility of naphthalene in carbon dioxide from 0° to 55° C. and for a range of pressures.

It is to be noted from FIG. 3 that at high pressure (above 120 atmospheres) the solubility of the solute naphthalene decreases gradually with decreasing temperatures from supercritical to subcritical conditions. At lower pressures (70 to 100 atmospheres), the solubility peaks in the near critical liquid region; and at 80 atmospheres the peak solubility occurs at 27° to 28° C. It should also be noted that on the saturation curve (dashed line), the solubility peaks in the near critical liquid region (25° to 27° C.) and decreases very sharply through the critical point and on the saturated vapor line. At 25° C. and 65 atmospheres, the solubilities in the saturated liquid and vapor are 0.0065 and 0.00044, respectively.

The data presented in FIGS. 1-3 are illustrative of one adsorbate/near critical liquid solvent combination to which the process of this invention is applicable. As will be apparent from the published literature cited above, carbon dioxide in the near critical liquid state has been shown to be an effective solvent for many of the organic materials listed in Table 1 which can be adsorbed on polymeric adsorbents. There are, of course, a large number of other compounds, both inorganic and organic, which are suitable as near critical liquids for the practice of this invention. Selected, exemplary near critical liquid solvents, their near critical temperature ranges and their enthalpies of vaporization, $\Delta H_V$, are listed in Table 2.

According to the process of this invention, the near critical liquid solvent is separated from the adsorbate and recovered for recycling by vaporizing the near critical liquid. This in turn requires that energy in the form of heat and equivalent to the latent heat of varporization must be supplied to the system for adsorbate separation and that energy in the form of refrigeration and equivalent to the latent heat of condensation must be supplied for solvent reliquefaction. Thus the enthalpy Table 2

Near Critical Properties for Selected Liquids

| Fluid | $T_c$, °K. | 0.95$T_c$ °K. | 0.95$T_c$ °C. | 0.995$T_c$ °K. | 0.995$T_c$ °C. | $\Delta H_v$ (Btu/lb) |
|---|---|---|---|---|---|---|
| Carbon dioxide | 304.2 | 289 | 16 | 303 | 30 | 150 |
| Ammonia | 405.5 | 385 | 112 | 403 | 130 | 545 |
| Water | 647.6 | 615 | 342 | 644 | 371 | 900 |
| Methanol | 513.7 | 488 | 215 | 511 | 238 | 461 |
| Ethanol | 516.6 | 491 | 218 | 514 | 241 | 374 |
| Isopropanol | 508.5 | 483 | 210 | 506 | 233 | 163 |
| Ethane | 305.6 | 290 | 17 | 304 | 31 | 229 |
| Nitrous oxide | 309.7 | 294 | 21 | 308 | 35 | 151 |
| n-Propane | 370.0 | 352 | 79 | 368 | 95 | 175 |
| n-Butane | 425.2 | 404 | 131 | 423 | 150 | 158 |
| n-Pentane | 469.8 | 446 | 173 | 467 | 194 | 144 |
| n-Hexane | 507.4 | 482 | 209 | 505 | 232 | 140 |
| n-Heptane | 540.1 | 513 | 240 | 537 | 264 | 127 |
| 2,3-Dimethylbutane | 500.0 | 475 | 202 | 498 | 225 | |
| Benzene | 562.1 | 534 | 261 | 559 | 286 | 162 |
| Dichlorodifluoromethane | 384.9 | 366 | 93 | 383 | 110 | 70 |
| Dichlorofluoromethane | 451.7 | 429 | 156 | 449 | 176 | 97 |
| Trichlorofluoromethane | 469.8 | 446 | 173 | 467 | 194 | 74 |
| Dichlorotetrafluoroethane | 419.3 | 398 | 125 | 417 | 144 | 58 |
| Chlorotrifluoromethane | 302.0 | 287 | 14 | 300 | 27 | |
| Ethylene | 282.9 | 269 | −4 | 281 | 8 | | of solvent vaporization is an important factor in the energy requirement, and hence economics, of the adsorbent regeneration.

The enthalpies of vaporization, $\Delta H_{v1}$, of liquids vary in a predictable manner as a function of temperature. It has been shown that $$\Delta H_v = k\,(T_c - T)^n$$

where k and n are constants and $T_c$ is the critical temperature. Watson (*Ind. Eng. Chem.*, 35, 398 (1943)) has extended this correlation and shown that n was about 0.38 for most liquids and that k could be eliminated by taking ratios of $\Delta H_v$ at two temperatures:

$$\frac{\Delta H_{v2}}{\Delta H_{v1}} = \left(\frac{1 - T_{r2}}{1 - T_{r1}}\right)^{0.38}$$

where $\Delta H_{v2}$ and $\Delta H_{v1}$ are the enthaplies of vaporization of a given liquid at $T_2$ and $T_1$, respectively, and $T_{r2}$ and $T_{r1}$ are the reduced temperatures ($T_2/T_c$ and $T_1/T_c$), respectively. Watson's correlation, following the above-stated relationship, is plotted as the solid line in FIG. 4. To normalize the ordinate for FIG. 4, the base value of $\Delta H_{v1}$ was taken a the enthalpy of vaporization at $T_{r1} = 0.67$. For many liquids, as reduced temperature of 0.65 to 0.70 is approximately equal to the normal boiling point. Thus, $\Delta H_{v1}$ is approximately equal to the enthalpy of vaporization at the normal boiling point. Data for four exemplary solvents suitable for the practice of this invention (carbon dioxide, ammonia, propane and ethylene) are also shown in FIG. 4 and these data indicate that the Watson correlation is applicable to a broad range of solvents.

Figure 4:
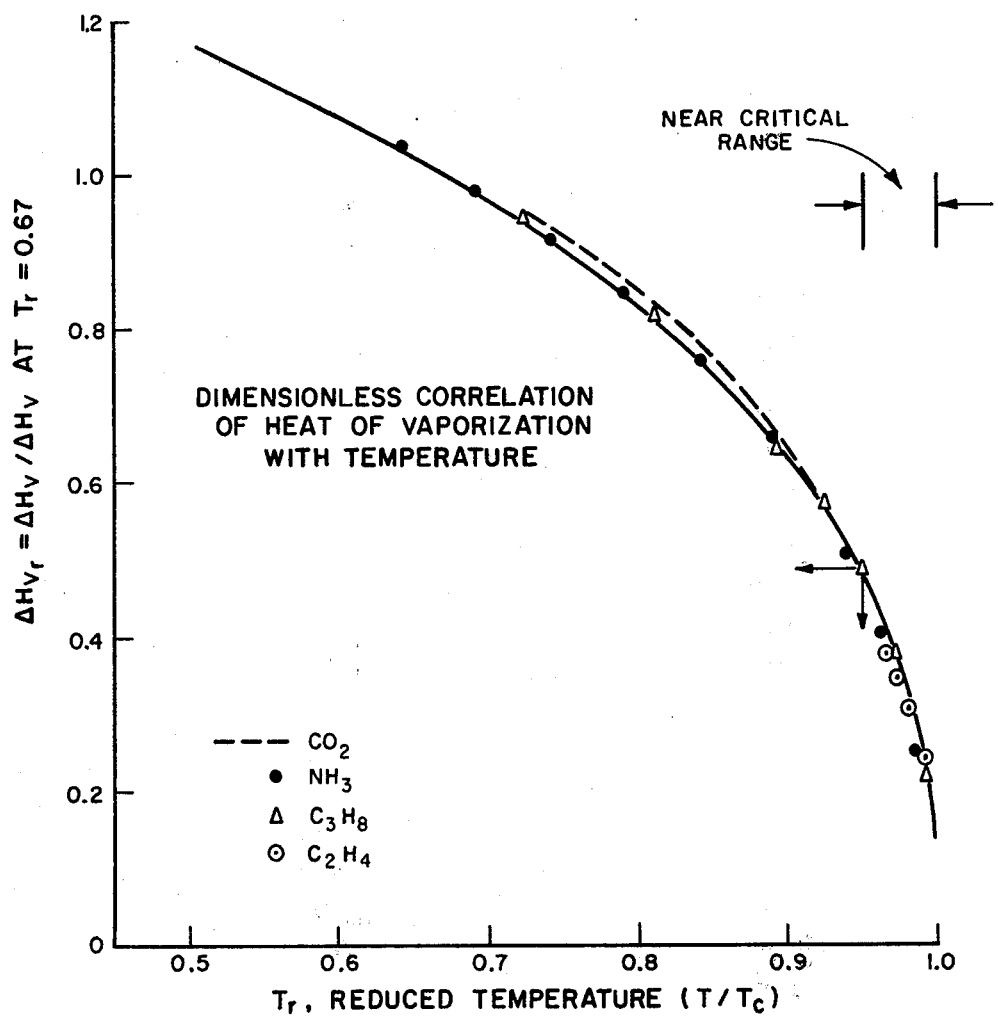
FIG. 4 is a plot illustrating the dimensionless correlation of heat of vaporization with temperature.

The data of FIG. 4 substantiate the above-stated definition for the near critical liquid range as used herein, i.e., a temperature at least 0.95 times the critical temperature. Within the near critical range the enthaply of vaporization, $\Delta H_v$, is equal to or less than one-half $\Delta H_v$ at the normal boiling point of the solvent.

The process of this invention may be further described and illustrated using naphthalene as the adsorbate, a polymeric resin adsorbent and near critical carbon dioxide liquid as the solvent/adsorbent regenerating material. A schematic for this system is detailed in FIG. 5.

The adsorbent, e.g., a nonpolar polystyrene resin sold as XAD-2 by Rohm and Haas Company, is placed in a pressure vessel 10 serving as the desorber. This polymeric adsorbent is characterized as having a porosity volume of 42%, a true wet density of 1.02, a surface area of 300 m²/gram, an average pore diameter of 90° A., a skeletal density of 1.07 grams/cc and a nominal mesh size of 20 to 50. During the adsorbing cycle, water containing naphthalene is introduced through valve-controlled line 11 into desorber 10 and clean, naphthalene-free water is discharged through valve-controlled line 12. When the breakthrough point is reached in the water in line 12, lines 11 and 12 are shut off.

Liquid carbon dioxide at 25° C. and 65 atmospheres, conditions which place the solvent within the required near critical liquid range, is then introduced into desorber 10 through valve-controlled line 13 and withdrawn, with naphthalene dissolved therein, through valve-controlled line 14. At that point in the regeneration cycle when the liquid carbon dioxide being discharged from desorber 10 no longer contains napthalene (detected spectrographically or by any other suitable technique), the flow of liquid carbon dioxide is stopped. As noted in FIG. 5, the solubility of naphthalene in saturated carbon dioxide liquid at 25° C. and 65 atmospheres is 0.0065 mole fraction and the specific volume of the napthalene is 62.4 cm³ per mole of carbon dioxide. This, of course, represents the upper limit of the concentration of the naphthalene in the carbon dioxide. Liquid carbon dioxide containing up to this concentration of naphthalene therefore represents the solvent which must be treated for recovery.

The liquid carbon dioxide containing the naphthalene is taken to the solute recovery vessel 15, serving as a vaporizer/separator, in which the carbon dioxide is at least partially vaporized and a multi-phase system comprising solvent-rich vapor and an absorbate-rich phase is formed. A carbon dioxide-rich liquid may also be present in recovery vessel 15. In a preferable embodiment of the process, a substantial portion, e.g., over 50% of the near critical liquid is vaporized. In order to maintain the concentration of any adsorbate in the solvent vapor at a predetermined level it may be necessary to distill adsorbate out of the solvent-rich vapor. This may be done by using one or more distillation plates 15a in or associated with the vaporizer/separator 15. If carbon dioxide-rich liquid is present it may be taken with the vapor out of vaporizer/separator to become part of the recycled near critical liquid.

Figure 5:
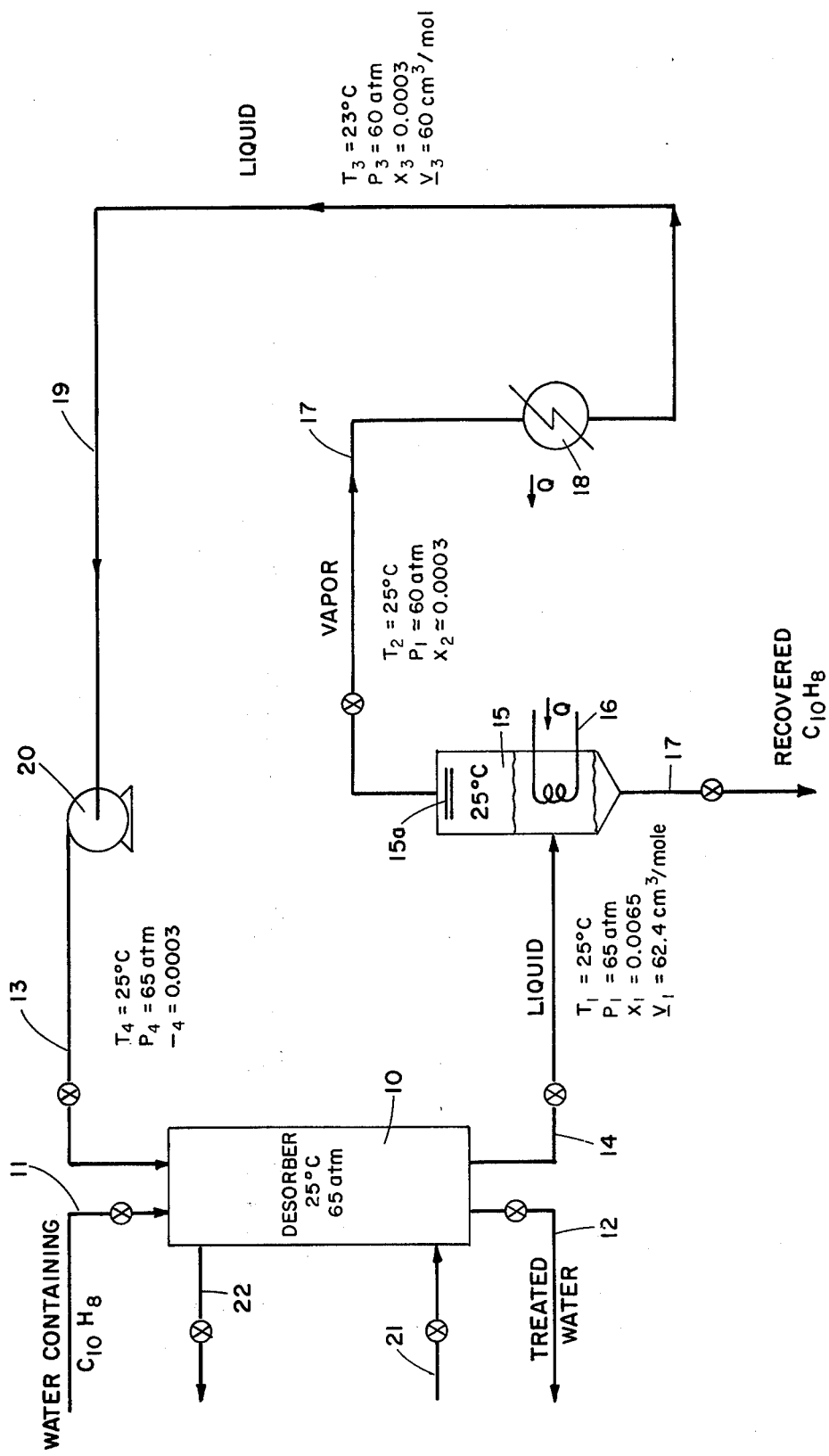
FIG. 5 is a schematic diagram of the process of this invention illustrating the regeneration of a polymeric adsorbent, having naphthalene adsorbed thereon, by the use of near critical carbon dioxide.

Vaporization of the liquid carbon dioxide is accomplished by supplying to it an amount of heat equivalent to the latent heat of vaporization of the carbon dioxide. As shown in FIG. 5, this may be done by circulating water at an appropriate temperature through coils 16 immersed in the carbon dioxide in vessel 15. The naphthalene thus separated out may be removed periodically from vessel 15 through a discharge line 17.

The carbon dioxide vapor leaving solute recovery vessel 15 is then taken, along with any carbon dioxide-rich liquid, through line 17 to condenser 18 where sufficient cooling is supplied to recondense the carbon dioxide vapor to a liquid. In this transfer to the condenser the temperature of the carbon dioxide is slightly reduced to 23° C. This slight reduction in temperature from recovery vessel 15 to condenser 18 provides a slight pressure drop to about 60 atmospheres to drive the vapor from one vessel to the other. The concentration of the naphthalene in the carbon dioxide vapor may be about 0.0003 mole fraction and it will remain at more or less this level during subsequent recycling. The condensed carbon dioxide is then directed through line 19 into recirculation pump 20 where it is repressurized to 65 atmospheres and the temperature brought back up to the desired 25° C. for reintroduction by way of line 13 into desorber 10.

Normally the adsorbent will not be dried prior to desorption in desorber 10 since water can be removed by the near critical carbon dioxide liquid and subsequently separated from it in the vaporizer/separator. However, it may be desirable in some cases to remove residual water from the adsorbent. If so, prior to regeneration of the adsorbent by desorbing with a near critical liquid, a drying gas, e.g. hot air, may be passed over the spent adsorbent to remove residual water by introducing it through line 21 and withdrawing it through line 22. Then carbon dioxide at atmospheric pressure is passed through the dried spent adsorbent to remove any air remaining in the pores of the spent adsorbent.

Based upon one pound of naphthalene recovered in the system illustrated in FIG. 5, the carbon dioxide recirculated in the system is 53 pounds, the heat transferred in the solute recovery vessel 15 and in the condenser 18 amounts to 2,710 Btu, and the work of recompression is 16 Btu. To remove an equivalent amount of naphthalene from an adsorbent using carbon dioxide in the supercritical state would require but about one-half as much supercritical fluid and less than one-half the amount of heat transferred. However, the work required in using near critical carbon dioxide is less than that for supercritical by a factor of about 20. Although the operating costs are probably comparable in the two processes, use of a near critical liquid as the adsorbate solvent requires considerably lower desorption pressure than the use of the same solvent in the supercritical state (e.g., for carbon dioxide 65 atmospheres compared with 300 atmospheres). This requirement for lower pressure will, in turn, be reflected in lower capital costs for the use of near critical liquids.

Although the mass transfer rate for desorption may generally be higher for supercritical fluids than for near critical liquid (since diffusivity increases with increasing temperature and descreasing density) this factor may be compensated for by increasing the residence time of the solvent in the desorber which, in turn, may require a larger vessel for desorption. For some systems, however, the desorption process may not be limited by mass transfer in the fluid and therefore any difference in diffusivity rates will not be a process factor.

Figure 6:
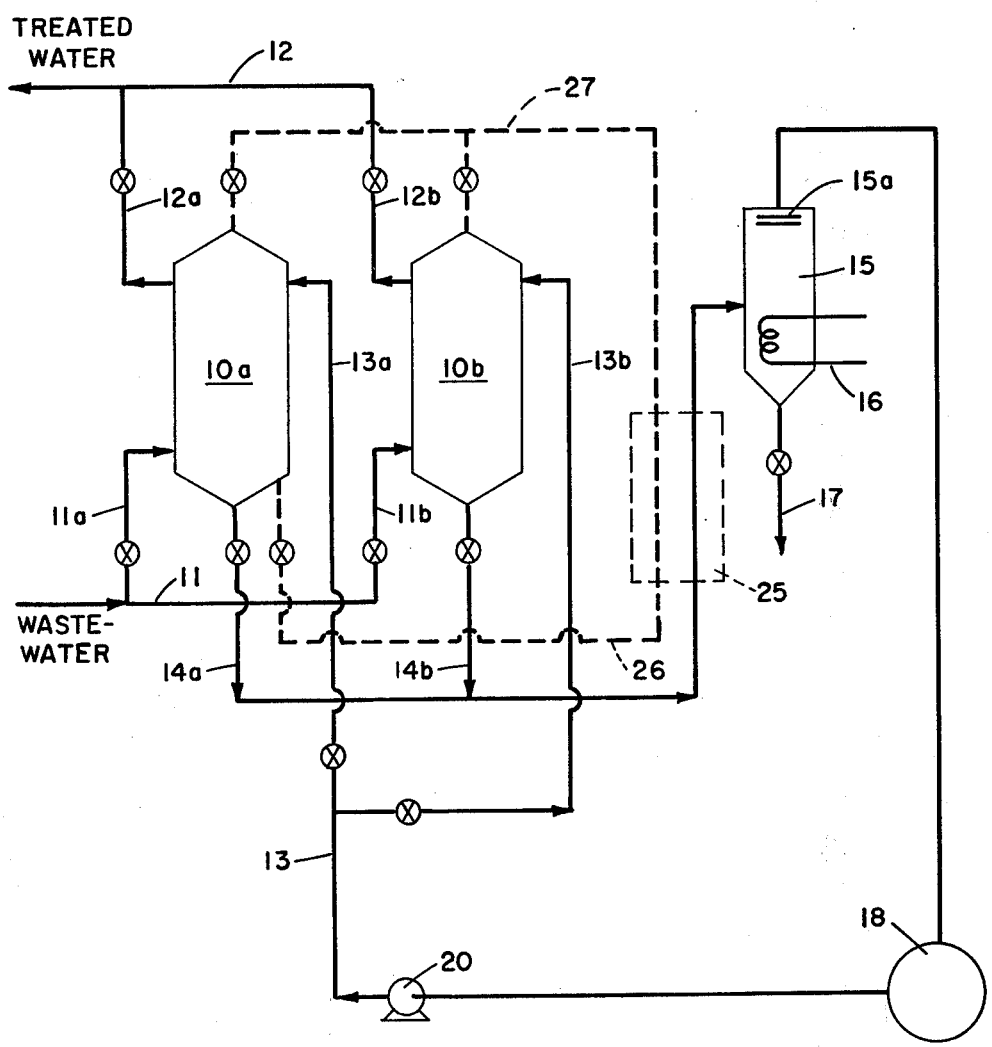
FIG. 6 is a schematic diagram illustrating the application of the process of this invention to wastewater treatment.

The incorporation of the adsorbent regeneration process of this invention into a wastewater purification system such as the one detailed above is illustrated diagrammatically in FIG. 6. The apparatus of FIG. 5 is employed; and since like reference numerals have been used to describe like components the description of the circulation of the supercritical fluid need not be repeated.

FIG. 6 illustrates the use of two alternating desorbers 10a and 10b which are cycled so that while one is in use the other may be regenerated. This is, of course, a well-known arrangement and any suitable number of desorbers may be used in parallel as well as in series. The wastewater to be purified is introduced through lines 11a and 11b into column 10a or 10b, depending upon which wastewater inlet line is open. Desorbers 10a and 10b are packed with the appropriate adsorbent to adsorb impurities and the treated water is discharged through line 12 by way of either 12a or 12b. If, for example, column 10b is off stream, it can be readied for reuse by circulating the near critical liquid therethrough in the manner described above in connection with FIG. 5. Likewise, when the stream of treated water discharged from desorber 10a has reached the breakthrough point, the desorbers are switched over.

As an alternative to performing both adsorption and desorption in columns 10a and 10b, a separate desorbing vessel 25 may be provided. In this case spent absorbent is transferred alternately from columns 10a and 10b into desorber 25 and the near critical liquid is introduced into and withdrawn from desorber 25 rather than columns 10a and 10b. The regenerated adsorbent is then returned to these columns through a transfer line 27.

In some cases it may be desirable to alter the chemical nature, and hence physical properties, of the adsorbate subsequent to its removal from the adsorbent. This may be done by reacting the adsorbate with a suitable reactant while it is dissolved in or mixed with the near critical liquid remaining in the solvent recovery vessel 15 at the end of a solvent recovery cycle. Any reactant used for the adsorbate must, of course, not be a reactant for the near critical liquid. Exemplary of such a reactant is oxygen to oxidize a hydrocarbon adsorbate when carbon dioxide is the near critical liquid.

As noted previously, there is a wide range of organic materials which can be adsorbed on a number of different types of adsorbents, both inorganic and organic. There are also a number of compounds capable of serving as near critical liquid solvents for removing these organic adsorbates from the adsorbent to regenerate it. Table 2 is a partial listing of the near critical liquids suitable for the practice of this invention. Among the other materials commonly used industrially as solvents and suitable for the practice of this invention are methane, propylene, haloethanes and halomethanes, sulfur dioxide, hydrogen chloride and hydrogen sulfide.

In choosing a near critical liquid for the regeneration of an adsorbent containing one or more organic species adsorbed thereon, the near critical liquid must be a solvent for the species to be removed and it must be a liquid which does not react with the surface of the adsorbent.

By using a near critical liquid to dissolve off the adsorbates from an adsorbent, the adsorbent is not subjected to any appreciable thermal or chemical degradation and the adsorbed species may be recovered if desired. Moreover, it is possible to use such near critical liquids as carbon dioxide, ethane or ethylene which require temperatures and pressures well within the capabilities of existing equipment. Finally, these fluids (and particularly carbon dioxide) are inexpensive, a fact which contributes materially to improving the economics of industrial processes and wastewater purification. Moreover, carbon dioxide is nonpolluting.

Organic impurities in wastewater in trace amounts may be detected and amounts as low as parts per billion may be measured. Subsequent to the removal of the impurities from a water stream by adsorption on an adsorbent they are dissolved in a near critical liquid in accordance with the process of this invention. Since essentially complete separation of the adsorbate impurities from the near critical liquid can be readily accomplished without effecting any chemical or physical change in the adsorbate, well-known analytical techniques may then be employed to determine precisely the amounts of the impurities in a given sample.

It will thus be seen that the objects set forth above, among those made apparent from the preceding description, are efficiently attained and, since certain changes may be made in carrying out the above process and in the constructions set forth without departing from the scope of the invention, it is intended that all matter contained in the above description or shown in the accompanying drawings shall be interpreted as illustrative and not in a limiting sense.

I claim:

1. A process for removing organic impurities from wastewater, comprising the steps of
   a. contacting an adsorbent with wastewater containing organic impurities thereby to adsorb said impurities as adsorbates on said adsorbent;
   b. contacting said adsorbent containing residual water remaining on said adsorbent subsequent to step (a) and having said adsorbate adsorbed thereon with a solvent for said residual water and said adsorbate, said solvent being inert to said adsorbent and being a liquid in the near critical state where in the temperature of said solvent ranges between about 0.95 and 0.995 times its critical temperature in degrees K and the pressure of said solvent is at least equivalent to its vapor pressure at the temperature at which it is used, thereby to remove said residual water and to desorb said adsorbate and dissolve it in said near critical liquid;
   c. separating said near critical liquid with said residual water and said adsorbate dissolved therein from said adsorbent;
   d. vaporizing at least a portion of said near critical liquid containing said residual water and said adsorbate dissolved therein to form a multi-phase system comprising solvent-rich vapor and a water-/adsorbate-rich phase;
   e. condensing said solvent-rich vapor to form a liquid; and
   f. adjusting the temperature and pressure of said liquid from step (e) thereby to convert it to said near critical liquid from recycling in the process.

2. A process in accordance with claim 1 wherein said adsorbent is an inorganic adsorbent.

3. A process in accordance with claim 2 wherein said inorganic adsorbent is activated carbon.

4. A process in accordance with claim 1 wherein said adsorbent is a synthetic polymeric adsorbent.

5. A process in accordance with claim 4 wherein said synthetic polymeric adsorbent is a polymer of styrene, a copolymer of styrene and divinylbenzene, or a polymer containing an acrylic ester, trimethylolpropane trimethacrylate or trimethylolpropane dimethacrylate.

6. A process in accordance with claim 1 wherein said solvent is carbon dioxide within a temperature range between 16° C. and 30° C.

7. A process in accordance with claim 1 including the step of distilling said solvent-rich vapor to separate out an additional quantity of said adsorbate.

8. A process in accordance with claim 1 wherein said wastewater comprises the bleaching effluent from a pulp mill and said organic impurities comprise color bodies.

9. A process in accordance with claim 1 wherein said wastewater comprises a stream containing waste dyestuffs as said organic impurities.

10. A process in accordance with claim 1 wherein said wastewater contains pesticides, detergents or explosives as said organic impurities.

11. A process in accordance with claim 1 wherein said wastewater contains a biological material as said organic impurites.

* * * * *